June 6, 1933.  W. A. ADAMS  1,913,226
VARIABLE SPEED MECHANISM
Filed May 8, 1930   2 Sheets-Sheet 1
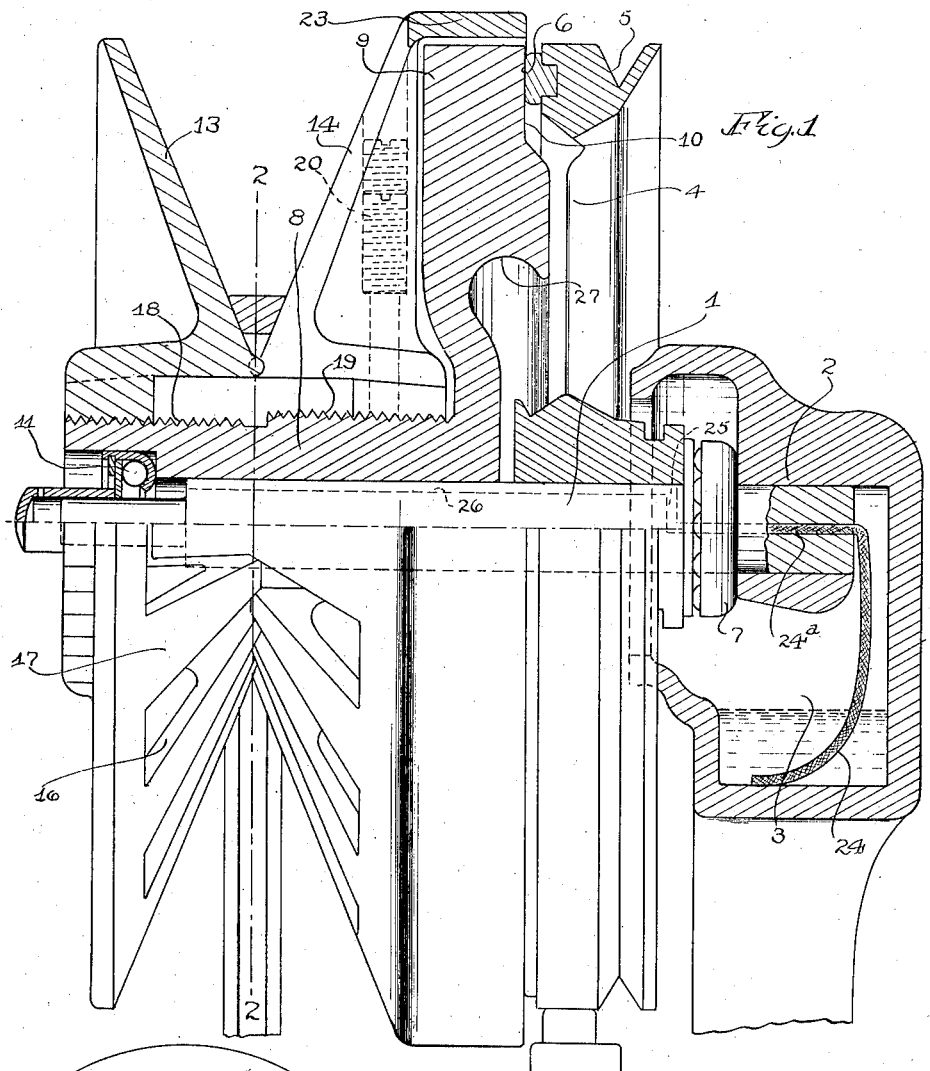
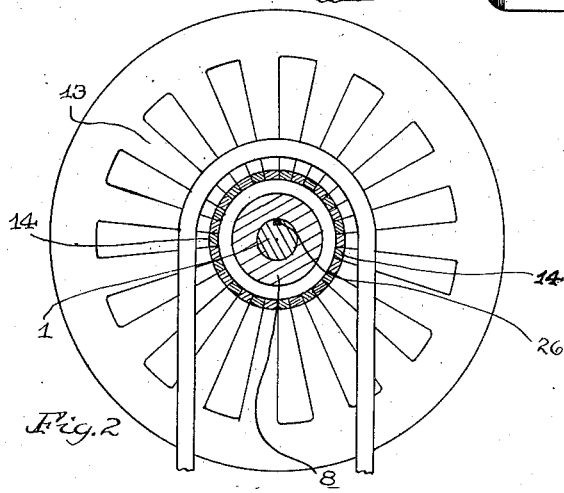
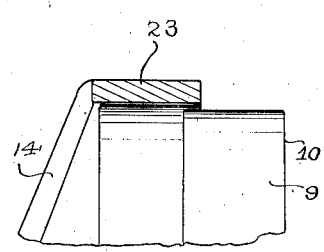
INVENTOR
Walter A. Adams
BY
his ATTORNEY June 6, 1933.  W. A. ADAMS  1,913,226
VARIABLE SPEED MECHANISM
Filed May 8, 1930  2 Sheets-Sheet 2
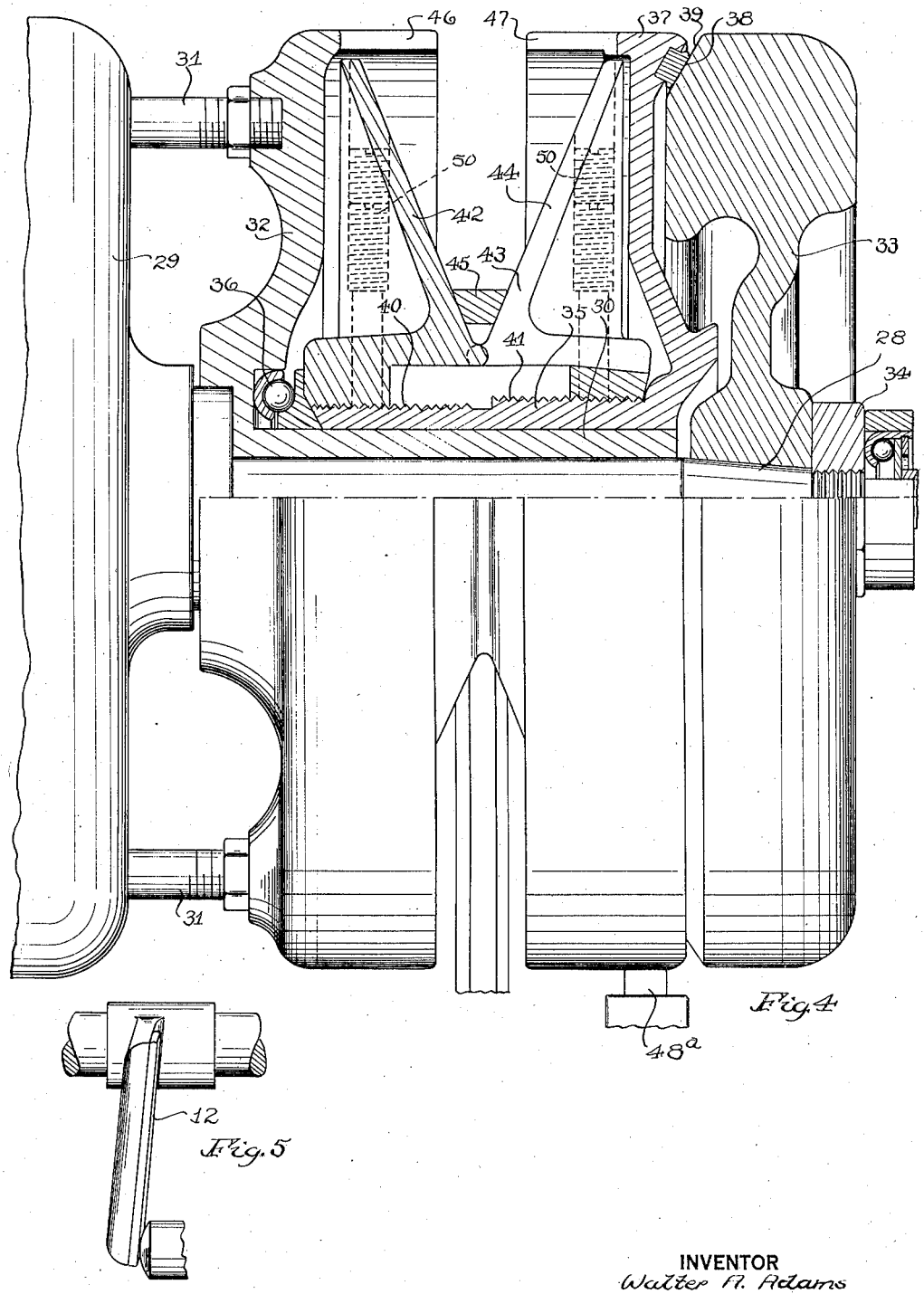
INVENTOR
Walter A. Adams
BY
his ATTORNEY Patented June 6, 1933

1,913,226

UNITED STATES PATENT OFFICE

WALTER A. ADAMS, OF ROCHESTER, NEW YORK

VARIABLE SPEED MECHANISM

Application filed May 8, 1930. Serial No. 450,815.

The present invention relates to variable speed mechanism and more particularly to the type in which a pulley is employed embodying a pair of relatively adjustable opposed cone members. An object of this invention is to provide for mounting the cone members in a novel relation so that the median plane of the pulley will not change notwithstanding the adjustment of the pulley for various speeds. Another object of the invention is to so associate a fly wheel with a variable pulley of the type described that the pulley may be employed as a housing for the balance wheel. Still another object of the invention is to provide a novel means for effecting an adjustment between two cone members forming a variable pulley.

To these and other ends, the invention consists of certain parts and combinations of parts, all of which will be hereinafter described, the novel features being pointed out in the appended claims.

In the drawings:

Fig. 1 is a view in side elevation and partial section of a variable speed mechanism embodying the present invention;

Fig. 2 is a section on the line 2—2, Fig. 1 or through the median plane of the pulley;

Fig. 3 is a fragmentary view showing another position of the cone member which acts as a housing for the balance wheel;

Fig. 4 is a view similar to Fig. 1 of another embodiment of the invention; and

Fig. 5 is a detail view of the operating mechanism for shifting the shaft and the balance wheel towards the driver.

In the embodiment of my invention illustrated in Figs. 1 to 3 inclusive, 1 indicates a stationary hub or shaft which is supported at one end in a bracket 2 containing a lubricating chamber 3. Mounted to turn on this fixed shaft is a member in the form of a combined pulley and clutch member 4 formed in its periphery with a belt groove 5 for a drive belt and on one side with a clutch face 6. The hub on the other side of the member 4 abuts a thrust bearing 7 arranged in the bearing post.

Mounted to turn and to move axially on the stationary shaft 1 is a hollow shaft 8 which at its inner end or end adjacent the member 4 has a combined balance wheel and clutch member 9. This member 9 is rigid with the hollow shaft 8, being, in this instance, cast in one piece therewith. When the shaft 8 is moved axially in one direction, a clutch face 10 on the balance wheel is moved into engagement with the clutch face 6 and the balance wheel 9 with the shaft 8 turns with the driver 4. The free end of the shaft 1 carries a thrust bearing 11 which cooperates with the end of the shaft 8 and may be moved through an operating mechanism 12 to shift the shaft 8 and balance wheel 9 toward the driver 4, the operating mechanism holding such clutch faces in engagement until released when the clutch faces separate automatically.

Arranged on the hollow shaft 8 to one side of the balance wheel 9 is a variable pulley comprising two opposed cone members 13 and 14 relatively movable to change the diameter of the annular groove formed between them. It is preferred to mount the cone members so that they are not only adjustable relatively to each other but also relatively to the balance wheel 9, so as to maintain the median plane 2—2 through the pulley at all times in the same position in order that the belt 15 which operates between the two cone members will not shift sidewise with each adjustment of the variable pulley.

The two cone members 13 and 14 are interlocked so as to turn together but to permit relative movement in an axial direction, and to this end, each has in its cone portion a plurality of radial slots 16 which widen or flare outwardly from the center of the cone and provide between them solid portions 17 of substantially the same form. The solid portions 17 of one cone member operate in the slots 16 of the other member on relative movement between the members, the solid portions 17 forming the interlocking connections and also serving to provide the annular belt groove in the pulley, the diameter of which varies on the relative adjustment between the cone members.

To effect the relative adjustment of the members to each other and to the balance wheel, the shaft 8 is provided with two portions 18 and 19 of two different diameters, the larger diameter 19 being nearer the balance wheel. One of these portions has a right hand thread and the other portion has a left hand thread, for engagement with like threads on the cone members 13 and 14, the pitch of the threads on the two parts being such that will move equal amounts axially for the same amount of rotation relatively to the shaft 8. Carried by the cone member 13 is a set screw 20 which will engage the hollow sleeve 8 to lock said member 13 against turning and through the interlocking portions between the cone members also locking the cone member 13 against rotation on the shaft 8.

To house said balance wheel to prevent dust entering between it and the cone member 14, the latter has an outwardly extending flange 23 projecting from the outer face thereof about the perimeter of the balance wheel. The length of this flange is such that for any adjustment of the cone 14, the flange will bridge the gap between the cone 14 and the balance wheel 9. A brake 48 may cooperate with the periphery of the pulley 4.

The lubrication of the shaft 8 may be effected by a wick 24 leading from the chamber 3 through a central bore 24$^a$ in the stationary shaft 1 to a lateral bore 25 which opens to a longitudinally extending groove 26. The latter opens between the driver 4 and the balance wheel 9 which is formed with an annular lubricant trap 27 overhanging or surrounding the exposed portion of the groove 26 and holds the lubricant away from the clutch faces. The lubricant is held in this pocket by centrifugal force until the balance wheel stops when it will follow the wall of the trap 27 and return again to the shaft 1.

To vary the speed, the set screw is loosened, and the cone members 13 and 14 are turned on the hollow shaft 8 until the desired diameter has been attained in the groove of the pulley, after which the set screw 20 is again tightened. Both cone members are interlocked and turn together, at the same time moving relatively to each other the same relative amount so that the median plane of the pulley does not shift. The balance wheel is housed by one of the cone members and the formation of a gap between the pulley and the balance wheel is prevented. The structure is durable in use, inexpensive to manufacture and simple in operation.

In the embodiment shown in Fig. 4, the main drive shaft 28 may be the drive shaft of an electric motor to the casing 29 of which a hollow stationary shaft 30 which surrounds the drive shaft 28 may be secured preferably by bolts 31 which connect with a disk 32 integral with the inner end of the hollow stationary shaft 30. On the tapered outer end of the driving shaft 8 a combined balance wheel and clutch member 33 is rigidly secured by a nut 34 which houses the thrust bearing 34$^a$.

Between the disk 32 and the balance wheel 33 on the stationary hollow shaft 30 is arranged to turn a variable speed pulley. This pulley, in this instance, comprises a hollow hub 35 having its inner end cooperating with a thrust bearing 36 and provided adjacent its outer end with an integral disk 37 which has a clutch surface 38 for cooperating with a clutch surface 39 on the balance wheel 33, the latter being moved axially with the motor shaft 28 which has a slight axial movement to engage the clutch disk 37 in order to establish driving connection with the hub 35. The latter has two screw threaded portions 40 and 41 of different diameters one having right hand screw threads and the other left hand screw threads, the portion 40 adjacent the free end of the hub being of smaller diameter than the portion 41. On these two portions are arranged the internally threaded hubs of two opposing cone shaped disks 42 and 43. These disks have radial flaring slots which provide between them portions 44 of the same form so that the two portions may interlock to turn together on the screw threaded portions 40 and 41 and move relatively axially in opposite directions to provide different effective diameters for the pulley. This movement is effected by producing a relative turning action between the member 37 and the pulley members 42 and 43. Screws 50 may be carried by the pulley members to engage the hub 35 in order to hold the pulley members in adjusted positions.

The endless belt 45 operates between the two members of the changeable pulley. In order to enclose the hub parts of the pulley as much as possible to keep dust and other matter away from the bearings, by covering the spaces between the pulley members or cones 42 and 43 and the disks 32 and 37 respectively for any adjustment of the cone members 42 and 43, in this instance, annular flanges 46 and 47 are projected laterally from the disks 32 and 37 respectively about the peripheries of the cone members 42 and 43, a brake 48$^a$ may cooperate with the flange to stop the turning of the expansible pulley.

In both embodiments of the invention, the pulley embodies two cone shaped members which are relatively adjustable to maintain constant the median plane of the effective drive portion of the pulley for any adjustment thereof, that is, so that it does not shift. The relative adjustment of the cone members is effected through right and left hand threads on a hollow shaft which also carries a disk at one side of the pulley serving as a clutch member. Either the disk or the adjacent cone member or shell has an annular flange which extends about the outer part to maintain the gap between them closed. In one embodiment, the rotary hollow disk carrying shaft turns on a hollow stationary shaft in which a drive shaft turns. The drive shaft may be the shaft of an electric motor while the hollow stationary shaft may be supported on the casing of the motor.

What I claim as my invention and desire to secure by Letters Patent is:

1. The combination with a shaft having right and left hand threaded portions, the shaft having two portions of different diameters, on each of which one of the screw threaded portions is formed, a disk projecting from the shaft adjacent the portion of the larger diameter, of a pulley comprising two cone members each mounted on one of the threaded portions to move thereon relatively to the other member and the disk, means connecting said members so that they may move axially relatively to each other but are caused to turn together when the shaft and the disk are turned relatively thereto.

2. The combination with a shaft and a disk turning therewith, of a pulley comprising two opposed cone members mounted on the shaft to one side of the disk, means for effecting the adjustment of the two members relatively to each other and to the disk, the said disk being located adjacent one cone member, one of such adjacent parts having an outwardly extending flange which extends about the other of said adjacent parts and covers the joint between the two in any position to which said cone member may be adjusted.

3. The combination with a stationary shaft, and a hollow shaft mounted to turn thereon, one of said shafts being axially movable, a flange arranged on and rigid with one end of the hollow shaft and having a clutch face, a clutch member arranged on the other shaft to be engaged by the clutch face on the hollow shaft on the relative axial movement of the two shafts, and a pulley comprising two cone members adjustably arranged on the hollow shaft to one side of the disk.

4. The combination with a shaft and a disk turning therewith, said shaft having right and left hand threaded portions and two portions of different diameters on each of which one of the screw threaded portions is formed, of a pulley comprising two cone-shaped members, each mounted on one of the threaded portions to move thereon relatively to the other member and the disk, the said disk being located adjacent one cone member, one of such parts having an outwardly extending flange which extends about the other and covers the joint between the two in any position to which said cone members may be adjusted.

5. The combination of a main drive shaft, a hollow stationary shaft provided with an integral disk located at the inner end of the drive shaft, a combined balance wheel and clutch member carried by the outer end of the main drive shaft, a variable speed pulley including a hollow hub mounted on the stationary hollow shaft and provided at the outer end with an integral disk having a clutch surface to cooperate with the combined balance wheel and clutch, said hub having right and left hand threaded portions of different diameters, interiorly threaded cone members, each mounted on one of the said threaded portions to move relatively to the other member, and annular flanges projecting from the said disks and housing the cone members.

6. The combination of a main drive shaft, a combined balance wheel and clutch member carried by the main drive shaft, a hollow stationary shaft provided with an integral disk located axially opposite and in spaced relation to the combined balance wheel and clutch member, a variable speed pulley including a hollow hub mounted on the stationary hollow shaft and provided with an integral disk having a clutch surface to cooperate with the combined balance wheel and clutch, said hub having right and left hand threaded portions of different diameters, interiorly threaded cone members, each mounted on one of the said threaded portions to move relatively to the other member, and annular flanges projecting from the said disks and housing the cone members.

WALTER A. ADAMS.